United States Patent
Cao et al.

(10) Patent No.: US 9,325,625 B2
(45) Date of Patent: *Apr. 26, 2016

(54) MOBILE BROADBAND PACKET SWITCHED TRAFFIC OPTIMIZATION

(75) Inventors: Yang Cao, Westford, MA (US); Michael Nicolazzo, Philadelphia, PA (US); William M. Turner, Higganum, CT (US); Talbot Hack, Ann Arbor, MI (US); Moshe Suberri, Voorhees, NJ (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 89 days.

This patent is subject to a terminal disclaimer.

(21) Appl. No.: 12/702,807

(22) Filed: Feb. 9, 2010

(65) Prior Publication Data
US 2011/0170429 A1    Jul. 14, 2011

Related U.S. Application Data

(63) Continuation-in-part of application No. 12/684,427, filed on Jan. 8, 2010, now Pat. No. 8,514,697.

(51) Int. Cl.
*H04J 3/14* (2006.01)
*H04L 12/801* (2013.01)
*H04L 12/803* (2013.01)
*H04L 12/851* (2013.01)
(Continued)

(52) U.S. Cl.
CPC .............. *H04L 47/14* (2013.01); *H04L 47/122* (2013.01); *H04L 47/2483* (2013.01); *H04W 28/10* (2013.01); *H04W 24/00* (2013.01)

(58) Field of Classification Search
None
See application file for complete search history.

(56) References Cited

U.S. PATENT DOCUMENTS

| 4,730,348 A | 3/1988 | MacCrisken |
|---|---|---|
| 5,049,881 A | 9/1991 | Gibson et al. |
| 5,721,830 A | 2/1998 | Yeh et al. |

(Continued)

FOREIGN PATENT DOCUMENTS

| WO | 95/19662 A1 | 7/1995 |
|---|---|---|
| WO | 01/86988 A1 | 11/2001 |

(Continued)

OTHER PUBLICATIONS

Lte, "3rd Generation Partnership Project; Technical Specification Group Services and System Aspects; Local IP Access and Selected IP Traffic Offload; (Release 10)," 3GPP TR 23.829 V0.3.1 (Nov. 2009) Technical Report (2009).

(Continued)

*Primary Examiner* — Kouroush Mohebbi
(74) *Attorney, Agent, or Firm* — Finnegan, Henderson, Farabow, Garrett & Dunner, LLP

(57) ABSTRACT

A method in an electronic device and a system for use in a communication network including a core network and at least one access network are described. Intermediate service platforms in an access network process data bound from a base station towards a core network, and vice versa. A first data channel or stream is processed by the intermediate service platform. Exemplary embodiments bypass the intermediate service platform by intercepting a second data channel or stream bound for the intermediate service platform. The data in the second data channel or stream is processed and inserted into a data channel or stream downstream of the intermediate service platform.

19 Claims, 10 Drawing Sheets

(51) Int. Cl.
*H04W 28/10* (2009.01)
*H04W 24/00* (2009.01)

(56) References Cited

U.S. PATENT DOCUMENTS

| | | | |
|---|---|---|---|
| 5,924,114 | A | 7/1999 | Maruyama et al. |
| 6,021,408 | A | 2/2000 | Ledain et al. |
| 6,108,666 | A | 8/2000 | Floratos et al. |
| 6,363,470 | B1 | 3/2002 | Laurenti et al. |
| 6,490,252 | B1 | 12/2002 | Riggan et al. |
| 6,757,291 | B1 | 6/2004 | Hu |
| 7,003,533 | B2 | 2/2006 | Noguchi et al. |
| 7,657,938 | B2 | 2/2010 | Palmer et al. |
| 7,689,633 | B1 | 3/2010 | Li et al. |
| 7,733,247 | B1 | 6/2010 | He et al. |
| 7,742,406 | B1 | 6/2010 | Muppala |
| 7,773,507 | B1 | 8/2010 | Kasralikar et al. |
| 7,774,304 | B2 | 8/2010 | Banzon et al. |
| 7,885,988 | B2 | 2/2011 | Bashyam et al. |
| 7,926,108 | B2 | 4/2011 | Rand et al. |
| 8,024,313 | B2 | 9/2011 | Mousavi et al. |
| 8,037,105 | B2 | 10/2011 | Kegel et al. |
| 8,219,508 | B2 | 7/2012 | McMillen et al. |
| 8,514,697 | B2 | 8/2013 | Cao et al. |
| 8,560,552 | B2 | 10/2013 | Fortier |
| 2003/0217166 | A1 | 11/2003 | Dal Canto et al. |
| 2005/0044422 | A1 | 2/2005 | Cantrell et al. |
| 2007/0124788 | A1 | 5/2007 | Wittkoter |
| 2008/0095175 | A1* | 4/2008 | Grandhi et al. .......... 370/395.52 |
| 2008/0162574 | A1 | 7/2008 | Gilbert |
| 2008/0242224 | A1* | 10/2008 | Fratti et al. .................. 455/3.06 |
| 2009/0187673 | A1 | 7/2009 | Ramjee et al. |
| 2009/0217322 | A1 | 8/2009 | Hindle |
| 2009/0265777 | A1 | 10/2009 | Scott |
| 2010/0027533 | A1 | 2/2010 | Kant et al. |
| 2010/0034089 | A1 | 2/2010 | Kovvali et al. |
| 2010/0318505 | A1 | 12/2010 | Fisher et al. |
| 2011/0134830 | A1 | 6/2011 | Lin |

FOREIGN PATENT DOCUMENTS

| | | |
|---|---|---|
| WO | 2007/123760 A2 | 11/2007 |
| WO | 2011/085312 A1 | 7/2011 |

OTHER PUBLICATIONS

Stoke Inc., "Stoke Mobile Data Offload Solution Brief," retrieved online at: http://www.stoke.com/Solutions/smdo.asp (2009).

International Search Report for Application No. PCT/US2011/020683, dated Mar. 21, 2011.

Bentley, Jon et al., "Data Compression Using Long Common Strings," Proceedings of the Data Compression Conference DCC '99, pp. 287-295 (1999).

International Search Report and Written Opinion for Application No. PCT/US2011/024198, dated May 17, 2011.

International Search Report and Written Opinion for Application No. PCT/US2011/024206, dated May 13, 2011.

International Preliminary Report on Patentability for Application No. PCT/US2011/020683, 11 pages, dated Apr. 3, 2012.

Written Opinion for Application No. PCT/US2011/024198, 7 pages, dated Apr. 10, 2012.

Written Opinion for Application No. PCT/US2011/024206, pp. 1-9, dated Mar. 6, 2012.

International Preliminary Report on Patentability for Application No. PCT/US2011/024198, 11 pages, dated Jun. 21, 2012.

International Preliminary Report on Patentability for Application No. PCT/US2011/024206, 10 pages, dated May 2, 2012.

* cited by examiner

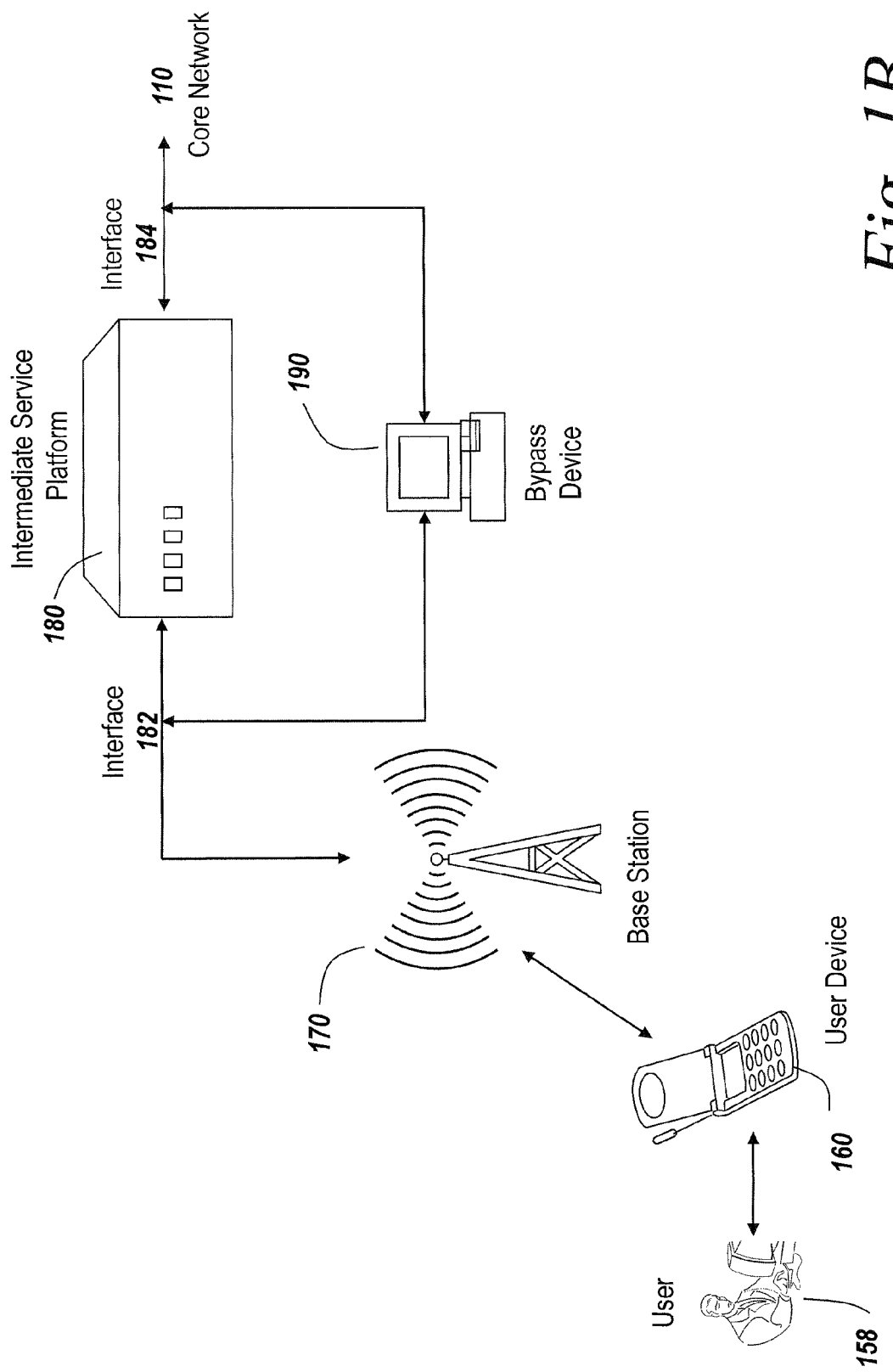

MOBILE BROADBAND PACKET SWITCHED TRAFFIC OPTIMIZATION

RELATED APPLICATION DATA

This application is a Continuation in Part of, and claims priority to, U.S. patent application Ser. No. 12/684,427, entitled "Mobile Broadband Packet Switched Traffic Optimization," filed on Jan. 8, 2010. The contents of the aforementioned Application are hereby incorporated by reference.

BACKGROUND

A communication network typically includes a core network and at least one access network. The core network is the central part of the communication network and serves as the backbone of the communication network. The core network generally includes high capacity switches and transmission equipment.

Each access network serves as a point of contact with the communication network for users. An access network connects subscribers with service providers. A communication network may have multiple access networks, serving different sets of users, in communication with a single core network.

Typically, a user device requests a certain piece of content, such as a web page or a file, from the network. The content may be located on an electronic device, such as a file server, which may be located in the local access network, the core network, or a different access network. The request for content is typically forwarded through the access network to the core network. Within the access network, a number of devices may facilitate the forwarding or delivery of requests and information from a user to the core network. A user typically interacts with an access network through a base station that receives information and requests from the user device. The base station forwards information and requests through the access network towards the core network. The base station typically routes data through an intermediate service platform, such as a network controller or switch, on the way to the core network. The intermediate service platform may forward the request to a gateway. The gateway connects the access network to the core network.

A core services platform is located within the core network. The core services platform is a device that performs a variety of services. For example, the core services platform may identify a location where requested content is stored. The core services platform coordinates the retrieval of the requested content and the delivery of the requested content to the user device.

The content is sent back through the access network through the gateway to the intermediate service platform and the base station, which provides the content to the user device.

As more users connect to an access network and as more content is requested, the user experience and the speed of content delivery in the network are degraded. The existing devices in the access network are unable to efficiently handle the greater amounts of traffic. This problem is compounded because more complex content, such as multimedia content, is also being provided from the core network. Upgrading the devices in the access network may be costly. It may also be difficult and expensive to reprogram, upgrade, and/or expand the devices in the access network to accommodate additional devices which may help to relieve the strain on the existing devices.

SUMMARY

The present application describes methods and devices for bypassing an intermediate service platform in an access network of a communication network while still leveraging the existing capabilities of the intermediate service platform. A bypass device may be located in the access network. The bypass device may receive data traffic bound from the core network to the access network and separate the data traffic based on the type of data received. For example, the bypass device may separate the data into a first set of data to be handled by the bypassed intermediate service platform and a second set of data to be handled by the bypass device.

The bypass device may process the second set of data while the bypassed intermediate device may process the first set of data. The bypass device may also monitor control traffic that specifies how the data should be processed or handled, and may use the information in the control traffic to facilitate the processing of the second set of data. The bypass device may also perform other control functions that facilitate the separation of data sets, and may provide additional functionality specific to the second set of data.

The bypass device may forward the processed second set of data to a device downstream of the bypassed intermediate service platform. For example, the bypass device may forward the data towards a base station.

According to one embodiment, a method is performed in an electronic device. The method provides content to a user device in a communication network. The communication network includes an access network and a core network. An intermediate service platform is provided in the access network, and a bypass device bypasses the intermediate service platform while allowing the intermediate service platform to process a first set of data.

Further, an electronic device is provided for bypassing an intermediate service platform. The electronic device includes storage for storing instructions for performing a method for bypassing the intermediate service platform, and a processor for executing instructions.

According to other embodiments, an electronic device readable storage medium storing executable instructions for bypassing an intermediate service platform is also provided.

BRIEF DESCRIPTION OF THE DRAWINGS

FIG. 1B depicts the mobile access network 150 of FIG. 1A in more detail.

DETAILED DESCRIPTION

According to exemplary embodiments, a bypass device is provided for bypassing one or more intermediate service platforms in an access network. By bypassing the intermediate service platform, the bypass device can provide additional processing capabilities in the access network without the need to invest in costly upgrades to the intermediate service platform. Further, the bypass device complements and supports the intermediate service platform by processing a portion of the data that would otherwise be processed by the intermediate service platform.

One or more sets of data may pass through devices in the access network. For example, a telecommunications network might provide users with voice and data services. The voice services may involve, for example, a first set of digitized voice data in a voice format. The data services may involve, for example, a second set of simple data in a simple data format and a third set of multimedia data in a multimedia data format. The bypass device may process and handle one type of data (e.g., the multimedia data) while passing other types of data (e.g., the voice data and the simple data) to an intermediate service platform. For example, the bypass device may perform optimizations, such as compression, ciphering, and traffic management, in order to facilitate the routing and processing of data in the network. Once the bypass device processes or handles the second set of data, the bypass device may forward the second set of data towards the base station for delivery to a user. The bypass device may process and handle the second set of data so that the intermediate service platform is not burdened.

Using the exemplary methods and devices described herein, a network provider may add functionality to an access network without performing expensive upgrades to intermediate service platforms or base stations. Accordingly, the network provider can increase the bandwidth, throughput, speed, and efficiency of the network while leveraging an existing infrastructure. Using the exemplary embodiments described herein, a network administrator does not need to make changes to their existing intermediate service platforms or base stations.

Further, the bypass device may optimize data traffic. For example, the bypass device may compress the second set of data or may cipher the second set of data. In this way, further functionality can be added to the network without making changes to the existing network infrastructure. If, for instance, a new compression algorithm is developed for multimedia data, a bypass device may be deployed to compress the multimedia data using the new compression algorithm; thus improving the speed, bandwidth and throughput of the access network without making expensive upgrades or reconfiguring existing network devices.

Figure 1A:
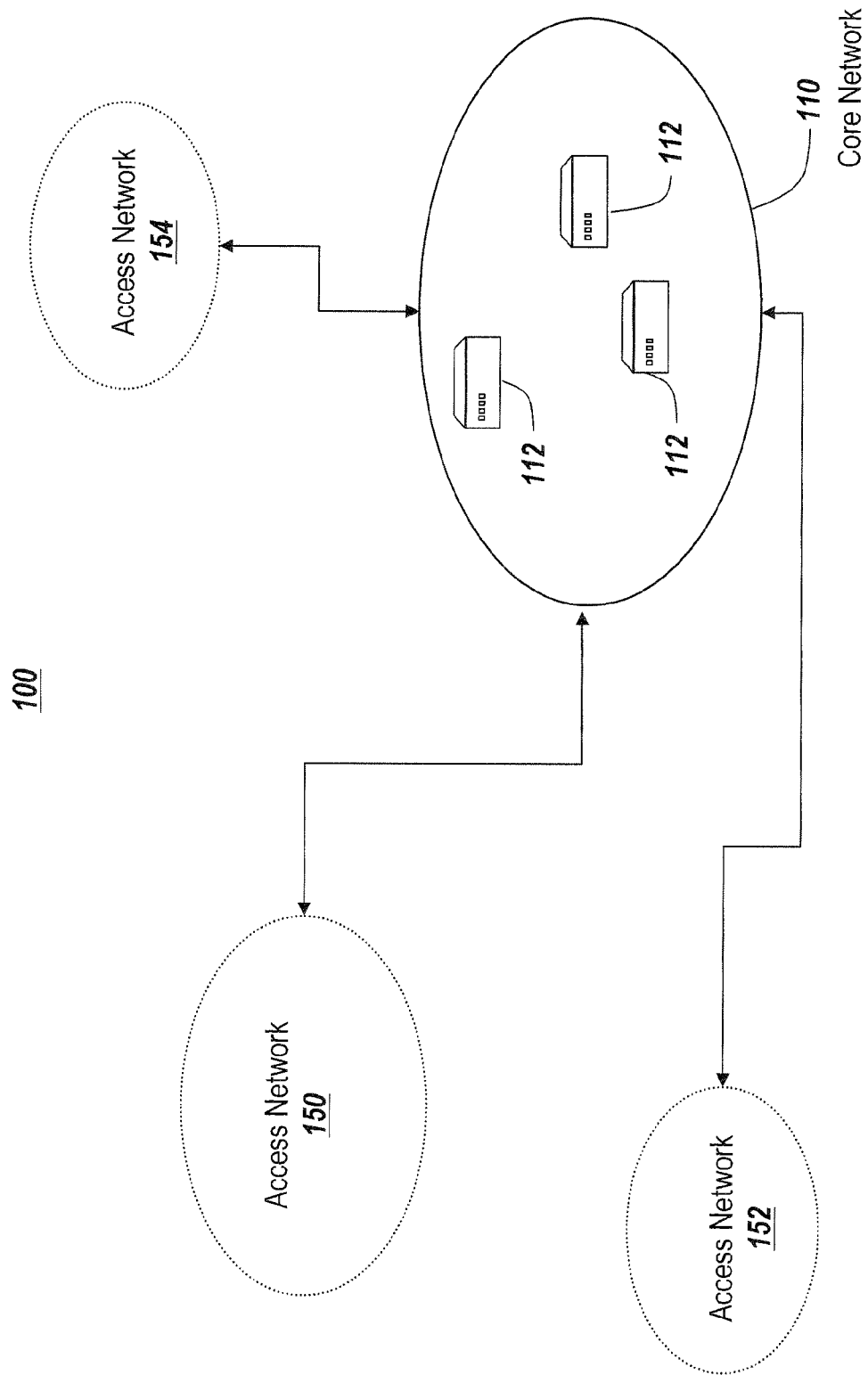
FIG. 1A depicts a communication network suitable for use in exemplary embodiments.

FIG. 1A depicts a communication network 100 suitable for use in exemplary embodiments. The communication network 100 may be a wireless network, a wired network or a combination or wireless and wired networks. The communication network 100 may be, for example, a Universal Mobile Telecommunications System (UMTS) network. For clarity, some exemplary embodiments are described herein with reference to a UMTS network. However, one skilled in the art will recognize that the functionality described herein is equally applicable in different types of communication networks, such as a network utilizing a WiFi framework, a WCDMA framework, a CDMA framework, a WiMax framework, an LTE framework, or a UMB framework, among others.

The communication network 100 may include a core network 110 and access networks 150, 152 and 154. Those skilled in the art will appreciate that the depiction of the communication network 100 in FIG. 1A is intended to be merely illustrative and not limiting. Other network configurations are possible in practicing the present invention. For example, the communication network may be fully distributed so as to have no core network, or may have more than one core network. The communication network may also have more or fewer access networks than the communication network 100 depicted in FIG. 1A. Some devices depicted in the communication network in the present figures may not be present in other communication networks, while other devices not depicted in the figures may be present.

The core network 110 may include one or more core services platforms 112. The core services platforms 112 may provide services within the core network 110, such as (but not limited to) fetching data from a storage repository or routing data throughout communications network 100. A core services platform 112 can take a number of forms, depending on the services to be provided. For example, core services platforms 112 may be servers within core network 110. Alternatively, a core services platform 112 may be a switch, a router, a server (such as a file server or a mail server), a network bridge, a network hub or a repeater.

Each access network 150, 152 and 154 serves as a point of contact with the communication network 100 for users and connects subscribers with service providers. Examples of access networks include, but are not limited to, the UMTS Terrestrial Radio Access Network (UTRAN), the GSM Radio Access Network (GRAN), and the GSM Edge Radio Access Network (GERAN).

FIG. 1B depicts exemplary access network 150 in more detail. A user 158 using a user device 160 may interact with the access network 150 via a communications device, such as a modem, fiber optic connection, or a transmitter and receiver for radio communication. The user device 160 may be, for example, but is not limited to, a computing device, a personal digital assistant, a cellular phone, or a Global Positioning System device. The user device 160 may send and receive data through a base station 170 located in the access network 150. The base station 170 may be, for example, a gateway, a cell tower, a Node B, or an Enhanced Node B.

Any of the devices in the communication network 100 (FIG. 1A) may send or receive data. Data includes information sent from one device to another in any format, including analog data, digital data, or a combination of analog and digital data. The data may be transmitted in discrete data packets, or in a non-packetized format, such as a continuous series of bytes, characters, or bits.

Data may be sent through the access network 150 using one or more data channels. A data channel, sometimes referred to as a data carrier, is a transmission medium or logical connection for carrying data from one point to another. Data channels include discrete logical fixed channels configured in a network. A data channel may be physical and tangible, such as a wire or fiber optic link, or may be intangible, such as a radio wave at a particular frequency or a wavelength of light. Data channels also include virtual or logical channels, such as software ports in a computer.

Data within a data channel may travel through the communication network 100 on one or more data streams. A data stream, sometimes referred to as a data flow, is a sequence of coherent signals used to transmit or receive information that is in transmission. Data streams include information carried in a data channel. As used herein, "downstream" in an access network refers to a direction of data flow in a data stream towards a base station in the access network (or, if present, towards a user device). As used herein, "upstream" in an access network refers to a direction of data flow towards the core network. Unless otherwise noted, procedures described herein as being performed on data traveling in one direction may also be employed on data traveling in the other direction.

Instead of employing multiple data channels, a single data stream may include data transmitted in first and second formats. The data stream may be provided over a single transmission medium, or multiple transmission media. For example, each channel may be provided on a different transmission media.

As used herein, the term data channel includes any way of differentiating one set of data from another set of data. A data channel may include, but is not limited to, a physical data channel such as a wire, an intangible data channel such as a radio wave, data in a particular format, or data having particular characteristics that differentiate the data from other data.

One or more data channels in the access network 150 may originate, for example, at the user device 160 or the base station 170. A data stream in the data channel may be directed from the base station 170 towards the core network 110. The base station 170 may interact with one or more intermediate service platforms 180 located in the access network 150 or may interact directly with the core network 110.

The intermediate service platforms 180 may perform tasks such as resource management (directing control of the network in a manner that allows the efficient use of network resources), filtering (inspecting incoming and outgoing data in order to remove extraneous, harmful, or harassing data), and routing (directing network traffic towards its appropriate destination and providing user mobility management). Examples of intermediate service platforms 180 include, but are not limited to, Radio Network Controllers, bridges, routers, and Virtual Private Network (VPN) servers.

One or more data channels may pass through the intermediate service platform 180, with each data channel carrying one or more streams of data. A bypass device 190 allows one or more of the data channels to bypass the intermediate service platform 180. The bypass device 190 may be, for example, a server, a router, a switch, a computer system, or a custom-designed device.

Data channels or data streams in a network may be governed by one or more interfaces. An interface in the context of a data stream refers to a set of protocols or technical characteristics that describe the connection between two entities and/or govern the transmission of data in the data stream. Each of the data streams provided between two devices in a network may be governed by different interfaces. For example, in a UMTS network, the data stream between the intermediate service platform 180 (a Radio Network Controller, or RNC, in one example) and a gateway device located before the core network 110 may be governed by the "Interface (Packet Switched)" (IuPS interface), and the data stream downstream of the intermediate service platform 180 may be governed by an interface for connecting the intermediate service platform with the base station (in the case of a Node B base station, for example, the interface may be a Node B interface, or IuB interface). Other examples of interfaces in the UMTS framework include an interface between intermediate service platforms, such as the IuR interface for signaling between two different Radio Network Controllers (RNCs). One of ordinary skill in the art will recognize that the above interfaces are provided merely as examples, and that the present invention may be applied to networks using any types of interfaces.

In exemplary embodiments, the bypass device 190 receives data on one or more interfaces, and sends data onto one or more interfaces. For example, if the bypass device 190 receives data on the interface 184 which is upstream of the intermediate service platform 180, the bypass device 190 may extract packet data from the upstream interface 184, and inject some or all of the data back onto the upstream interface 184. The bypass device 190 may also inject data onto another interface that the bypass device 190 is capable of reaching (e.g., the interface 182 that is downstream of the intermediate service platform 180). In this way, the bypass device 190 may bypass the intermediate service platform 180.

The user device 160 may send a request for data content to the network, and in doing so, may cause the base station 170 to start signaling the intermediate service platform 180 using an interface 182. Similarly, the core network may forward data to the access network, which may cause a device, such as a gateway device between the access network and the core network, to begin signaling the intermediate service platform 180 using an interface 184.

The bypass device 190 may monitor this signaling on interface 182 and interface 184 to identify an active data session, for example, an active data session initiated on behalf of the intermediate service platform 180, on behalf of a user device 160, or on behalf of one or more devices in the core network 110 or the access network 150. In order to monitor the signaling, the bypass device 190 may intercept, monitor, or receive data or traffic on the interface 182 and/or the interface 184. For example, the bypass device 190 may be include an input at a location in the data stream such that the data stream must pass through the input of the bypass device 190 before the data stream passes through the intermediate service platform 180. The bypass device 190 may also include an output such that data can be inserted into the data stream. The output may be located on the opposite side of the intermediate service platform 180 than the input. The bypass device 190 may monitor the traffic for an indication that a data session is being initiated, terminated, modified or moved, has already been initiated, terminated, modified or moved, or is about to be initiated, terminated, modified or moved.

The bypass device 190 may also be located at a location such that the data stream passes through both the intermediate service platform 180 and the bypass device 190. The bypass device 190 can monitor and/or intercept the traffic that passes through both interfaces 182, 184.

Once an active data session is identified, the bypass device 190 may take over the processing and handling of data in the data session. For example, the bypass device 190 may terminate and/or emulate the protocol layers involved in the active data session. The bypass device 190 may send out acknowledgements or network commands based on the data received at the bypass device 190. In exemplary embodiments where the bypass device 190 is employed in an existing network structure without making changes to the existing network devices, the bypass device 190 may emulate the existing network devices to make it appear that the network traffic is being routed to the destination intended by the other network devices. For example, if the core network 110 directs data to the intermediate service platform 180, and the bypass device 190 receives the data before the intermediate service platform 180, the bypass device may emulate the intermediate service platform 180 by sending acknowledgements and other protocol messages to the core network 110, possibly using an identifier associated with the intermediate service platform 180. The bypass device 190 may communicate that the data has been received by the intermediate service platform 180 so that the core network believes that the data has been handled appropriately. In the downstream direction, the bypass device 190 may emulate the intermediate service platform 180 towards the base station 170, for example by sending appropriate messages to the base station 170 using identifiers associated with the intermediate service platform 180.

Figure 2:
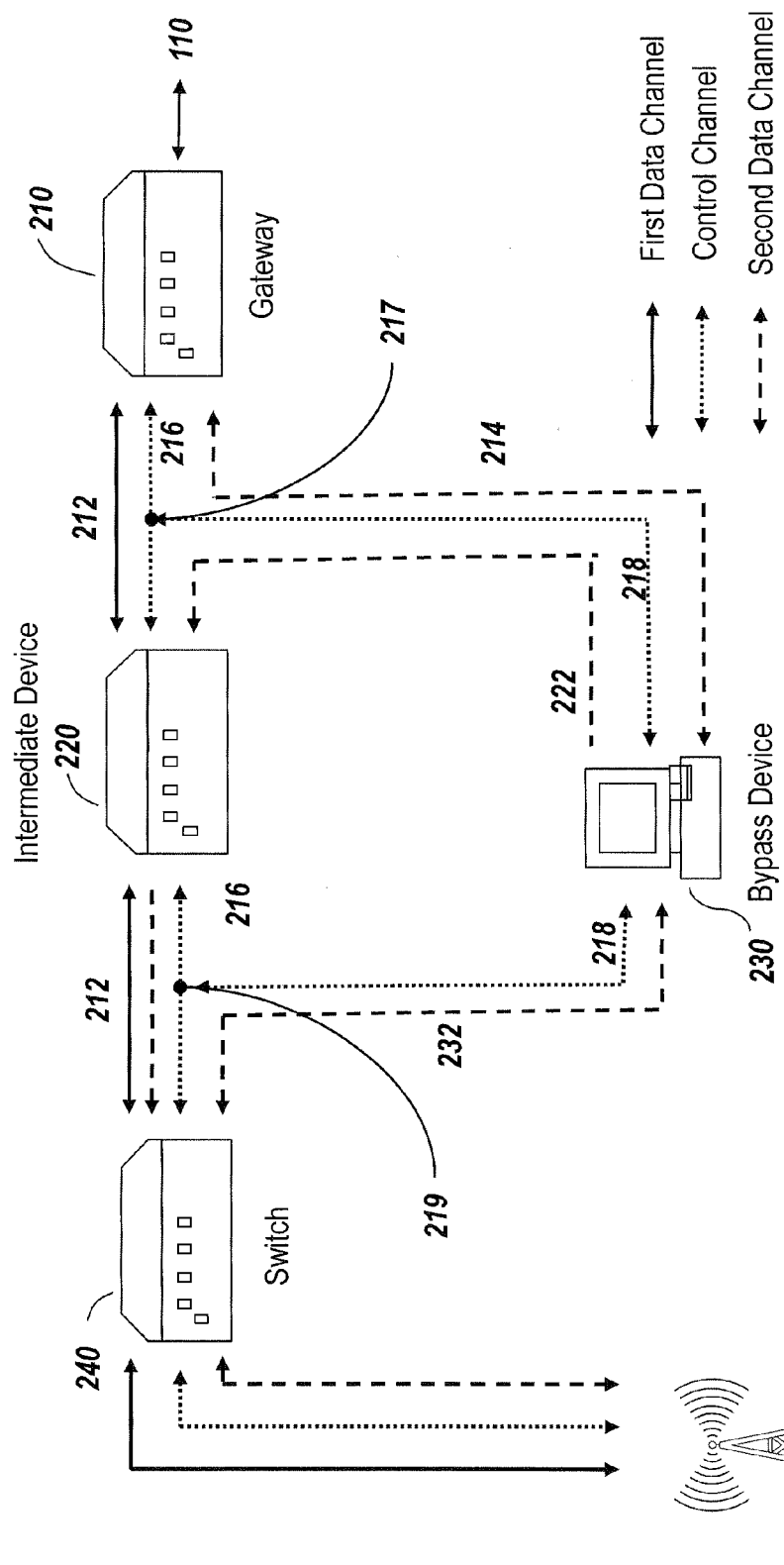
FIG. 2 depicts an exemplary data flow in a mobile access network according to exemplary embodiments.

FIG. 2 depicts an exemplary data flow in an access network 200 according to exemplary embodiments. FIG. 2 depicts data traveling through the access network 200 using a data stream having four different channels: a first data channel, a second data channel and a control channel. Although exemplary embodiments are described in terms of "data channels" and "data streams," one of ordinary skill in the art will recognize that the present invention is not so limited. Where "data channels" are referred to herein, data streams or other organizational systems may be employed, and vice versa.

Data originating in the core network 110 may first pass through a gateway 210 into the access network 200. The gateway 210 serves as the point of contact between the access network 200 and the core network 110. The gateway 210 sends and receives data on a data stream combining, for example, three data channels 212, 214, 216. The gateway 210 may be, for example, a switch, a router, a computer, or a custom-designed device. The gateway 210 may provide, for example, routing functionality, firewall functionality, filtering functionality, data collection, and/or billing functionality for a service provider. The gateway 210 may be, for example, a Gateway GPRS Support Node (GGSN), which serves an edge routing function for the access network.

In some embodiments, the first data channel 212 carries legacy data that can be efficiently or quickly processed by the intermediate service platform 220, while a second data channel 214 carries data that can be processed more efficiently or quickly by the bypass device 230. Data may be processed "more quickly" in that it takes less time to process the data by a quicker device. Data may be processed "more efficiently" in that it takes fewer resources (such as processing power or memory) to process the data by a more efficient device.

In some embodiments, the intermediate service platform 220 is not capable of processing data in the second data channel 214 because the intermediate device does not include hardware or software necessary to process data in the second data channel 214. In other embodiments, the intermediate service platform 220 is capable of processing data in the second data channel 214, but the intermediate service platform 220 has limited hardware of software capabilities that make it desirable to bypass the intermediate service platform 220.

In some embodiments, the data channels 212, 214 each carry data that could be handled quickly and efficiently by the intermediate service platform 220, but in order to relieve some of burden of processing or handling the data from the intermediate service platform 220, one or more of the data channels 212, 214 is diverted to the bypass device 230.

In some embodiments, the first data channel 212 is not provided, so that data is carried only a single data channel. Accordingly, the intermediate service platform 220 may be bypassed entirely for purposes of data processing.

Although some of the examples presented herein are described in terms of legacy data and non-legacy data, the present invention is not limited to these types of data. The first data channel 212 and second data channel 214 may carry any type of information in any data format.

The present invention is not limited to processing or handling exactly two data channels. In some embodiments, the intermediate service platform 220 processes more than one channel, and in some embodiments, the bypass device 230 processes more than one channel. Alternatively, the bypass device 230 may bypass the intermediate service platform 220 entirely such that all of the data channels of the data stream are routed through the bypass device 230 and not the intermediate service platform 220. The control channel 216 including instructions for handling the data stream may or may not be present.

If, for example, the communication network is a High Speed Packet Access (HSPA) network, the data stream may include a first data channel 212 carrying voice data and non-High Speed Downlink Packet Access (HSDPA) data, and a second data channel 214 carrying HSDPA data. The data stream may also include a control channel 216. In this example, the intermediate service platform 220 may be a Radio Network Controller (RNC) that manages a number of data channels. The RNC may be capable of handling the voice data, non-HSDPA data, and HSDPA data, but may, for example, suffer from limited throughput of the processing-intensive HSDPA data during peak periods of network usage. One of ordinary skill in the art will recognize that the present invention is not limited to an HSPA network, but may be employed in any type of communication network, including but not limited to a Code Division Multiple Access (CDMA) network and a WiMax network.

In a conventional network, the gateway 210 sends three data channels 212, 214, 216 directly to the intermediate service platform in a downstream direction. In contrast to the conventional network, exemplary embodiments described herein provide a bypass device 230 in the access network 200 for bypassing the intermediate service platform 220 with respect to one or more data channels in the data stream. In some embodiments, the bypass device 230 receives each of the data channels 212, 214, 216 in the data stream, and then selects which data to forward to the intermediate service platform 220 and which data to keep in the bypass device 230 for further processing. In the embodiment depicted in FIG. 2, the intermediate service platform 220 receives and processes the first data channel 212, while the second data channel 214 is intercepted by the bypass device 230. The bypass device 230 may intercept the downstream-traversing second data channel 214 bound from the gateway 210 towards the intermediate service platform 220, and may also intercept the upstream-traversing second data channel 222 bound from the intermediate service platform 220 towards the gateway 210.

For the purposes of this application, the bypass device is considered to be at the same location as the bypassed intermediate service platform in the data stream. The bypass device may receive or intercept data from the data stream, and insert or inject data into the data stream, either upstream or downstream of the intermediate service platform which the bypass device bypasses. The physical location of the bypass device may be the same as, or different than, the intermediate service platform.

In some embodiments, the bypass device 230 may intercept the second data channel 214 such that the second data channel 214 is not provided to the intermediate service platform 220. For example, the bypass device 230 may terminate one or more protocols or protocol layers associated with the second data channel 214 by receiving data in the second data channel 214 from the gateway 210, and emulating the intermediate service platform 220 to the gateway 210 by sending acknowledgements of receipt of the data and other protocol messages to the gateway 210. The same may be done in reverse (i.e., the bypass device 230 may receive data from the intermediate service platform 220 bound for the gateway 210 and emulate the gateway 210 by sending messages to the intermediate service platform 220). In this way, the second data channel 214 is not provided to the intermediate service platform, but it appears to the gateway 210 that the data has been appropriately received by the intermediate service platform 220. In this way, the second data channel 214 does not consume the resources of the intermediate service platform 220.

In addition to the first data channel 212 and the second data channel 214, a control channel 216 may be provided for instructing devices in the access network how to handle incoming and outgoing data packets, data channels, and/or data streams. The bypass device 230 may monitor 218 the control channel 216, for example at a point 217 between the gateway 210 and the intermediate service platform 220 in the data stream and at a point 219 between the intermediate service platform 220 and the base station 260.

The bypass device 230 may process the second data channel 214. For example, the bypass device 230 may perform compression and/or ciphering, as described in more detail with respect to FIG. 4 below. Once the second data channel 214 has been processed by the bypass device 230, the bypass device may forward the bypassed data 232 towards the base station 260.

In exemplary embodiments, the bypass device 230 determines what fraction of data traffic flow bypasses the intermediate service platform 220. For example, the bypass device 230 may intercept and process all of the data in the second data channel 214, or may determine that only a portion of the data in the second data channel 214 should bypass the intermediate service platform 220. The bypass device 230 may be preprogrammed with this determination, or may determine a fraction of data traffic flow that bypasses the intermediate service platform 220 dynamically, based on either the status of the intermediate service platform 220 or the status of other devices or traffic flows in the network.

In some embodiments, the bypass device 230 bypasses only a portion of the data traffic flow. For example, the bypass device 230 may bypass a portion of the data traffic flow while relying on the intermediate service platform 220 to handle traffic related to power management, radio resource management, certain types of data, etc.

A switch 240 may also be provided in the access network 200. The switch 240 may facilitate the interception of the second data channel traveling 214 upstream from the base station 260 towards the gateway 210.

As indicated by the bidirectional arrows in FIG. 2, the above procedure may also be applied in the reverse direction for data traveling upstream from the base station 260 towards the gateway 210.

Figure 3:
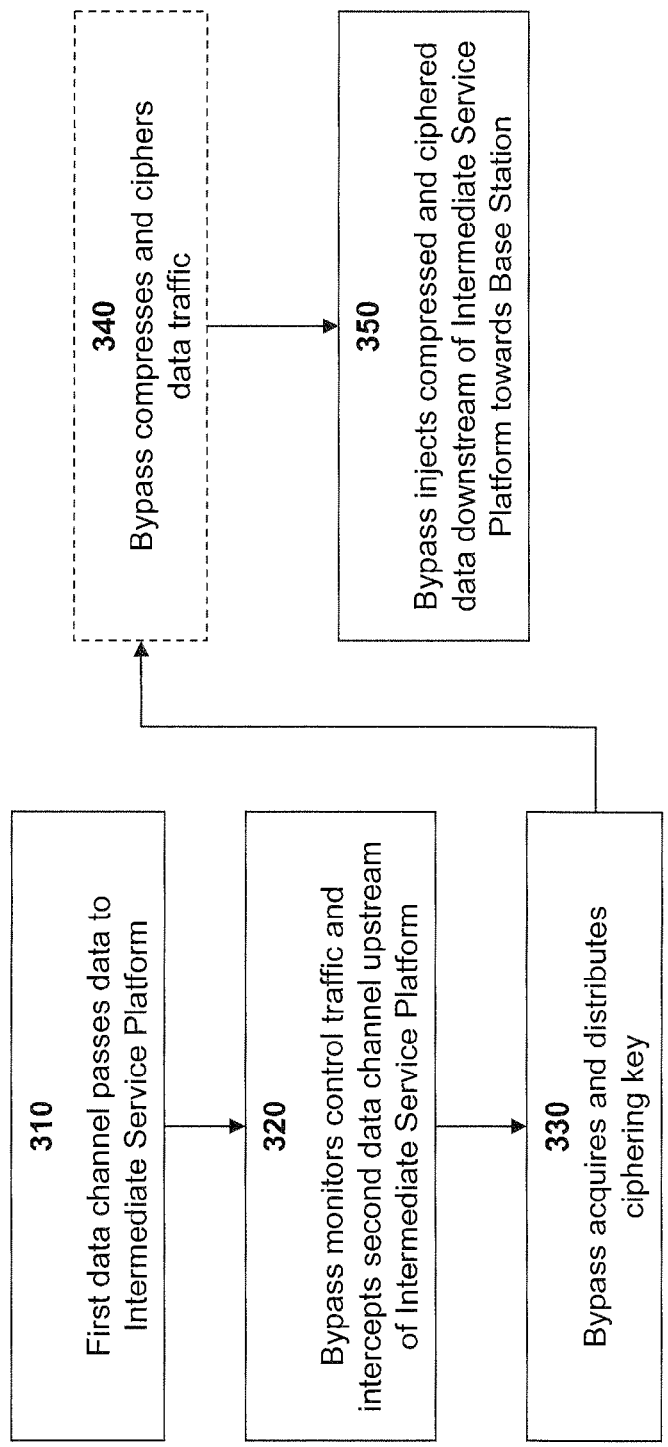
FIG. 3 is a flow chart depicting an exemplary procedure for bypassing an intermediate service platform in an access network.

FIG. 3 is a flow chart depicting an exemplary procedure for bypassing an intermediate service platform in an access network from the perspective of a data stream including three data channels traveling in a downstream direction from the core network towards a base station.

At step 310, a first data channel passes data to intermediate service platform. The first data channel may originate at the core network, or may originate at a gateway between the core network and the access network. The gateway may also be provided in the access network. The first data channel may include legacy data that may be efficiently processed by the intermediate service platform. In some embodiments, no first data channel is provided and the intermediate service platform is bypassed entirely.

The first data channel may be passed to the intermediate service platform in a number of ways. For example, the first data channel may first pass from the gateway through the bypass device, which may then forward the first data channel to the intermediate service platform. Alternatively, the first data channel may be provided to the intermediate service platform without first passing through the bypass device.

At step 320, a bypass device monitors control traffic in a control channel and intercepts a second data channel upstream of intermediate service platform. The bypass device may monitor multiple control channels. In some embodiments, the bypass device monitors control channels on the network's IuPS interface and control channels on the IuB interface. The control channel may include, for example, information provided according to the Radio Access Network Application Part (RANAP) protocol. The second data channel may include non-legacy data that cannot be efficiently processed by the intermediate service platform, or that cannot be processed by the intermediate service platform at all. Alternatively, the second data channel may simply carry different data than the first data channel. The bypass device may use information in the control channel to process or route data in the second data channel. The bypass device may terminate the second data channel between the gateway and the intermediate service platform such that the second data channel does not reach the intermediate service platform.

At step 330, the bypass device may acquire and distribute one or more ciphering keys. If the bypass device is used to cipher the data in the second data channel, the bypass device may provide the ciphering keys to a remote node located downstream from the bypass device in order to allow the remote node to decipher the data. The bypass device may acquire the ciphering keys, for example, using the RANAP protocol on the control channel.

At step 340, the bypass device may optionally compress and cipher the data traffic in the second data channel in order to form a bypass data channel carrying data in a bypass format. Ciphering is a procedure for encrypting information. Compression is a procedure that takes original data and encodes the data using fewer information units (for example, bits) than the original data. The use of compression may facilitate the optimization of data transmission in the network. It is to be understood that the term "optimization" includes elements that improve the speed or efficiency of data transmission in the network, or allow data transmission to be accomplished with fewer resources, although an "optimization" need not enable optimal or maximal data transmission. The bypass device may also perform other optimizations for data transmission in the network, such as error detection and prevention, filtering, bypassing one or more slower devices, adaptive or dynamic congestion control, dynamic policy enforcement that selectively invokes network policies based on traffic flows, distributed monitoring, and mobile analytics.

If compression is already employed in the access network outside of the bypass device, the compression algorithm employed at step 340 may be the same as or different than the compression otherwise employed in the access network. If ciphering is already used in the access network outside of the bypass device, the ciphering algorithm employed at step 340 may be the same as or different than the ciphering otherwise employed in the access network. The compression and ciphering algorithms may be selected based on one or more properties of the data in the second data channel. For example, some compression algorithms are better suited to HSDPA data, which may be carried in the second data channel, than non-HSDPA data, which may be carried in the first data channel. The bypass format of the bypass data channel may be the same as, or different than, the format used in the data stream between the gateway and the intermediate service platform or the format used in the data stream between the intermediate service platform and the base station. The bypass format may or may not be compatible with the intermediate service platform, and the bypass format may or may not be compatible with the base station.

At step 350, the bypass device injects the compressed and ciphered data into a data stream downstream of the intermediate service platform. The bypass device may direct the bypass data stream to a switch or a base station, or to another intermediate device.

The preceding description provides a high-level overview of the devices in the network and exemplary procedures performed in the access network as a whole. The bypass device is discussed in more detail below. Specifically, FIGS. 4-7 graphically depict the way that the bypass device interacts with the data stream and the other devices in the network.

Figure 4:
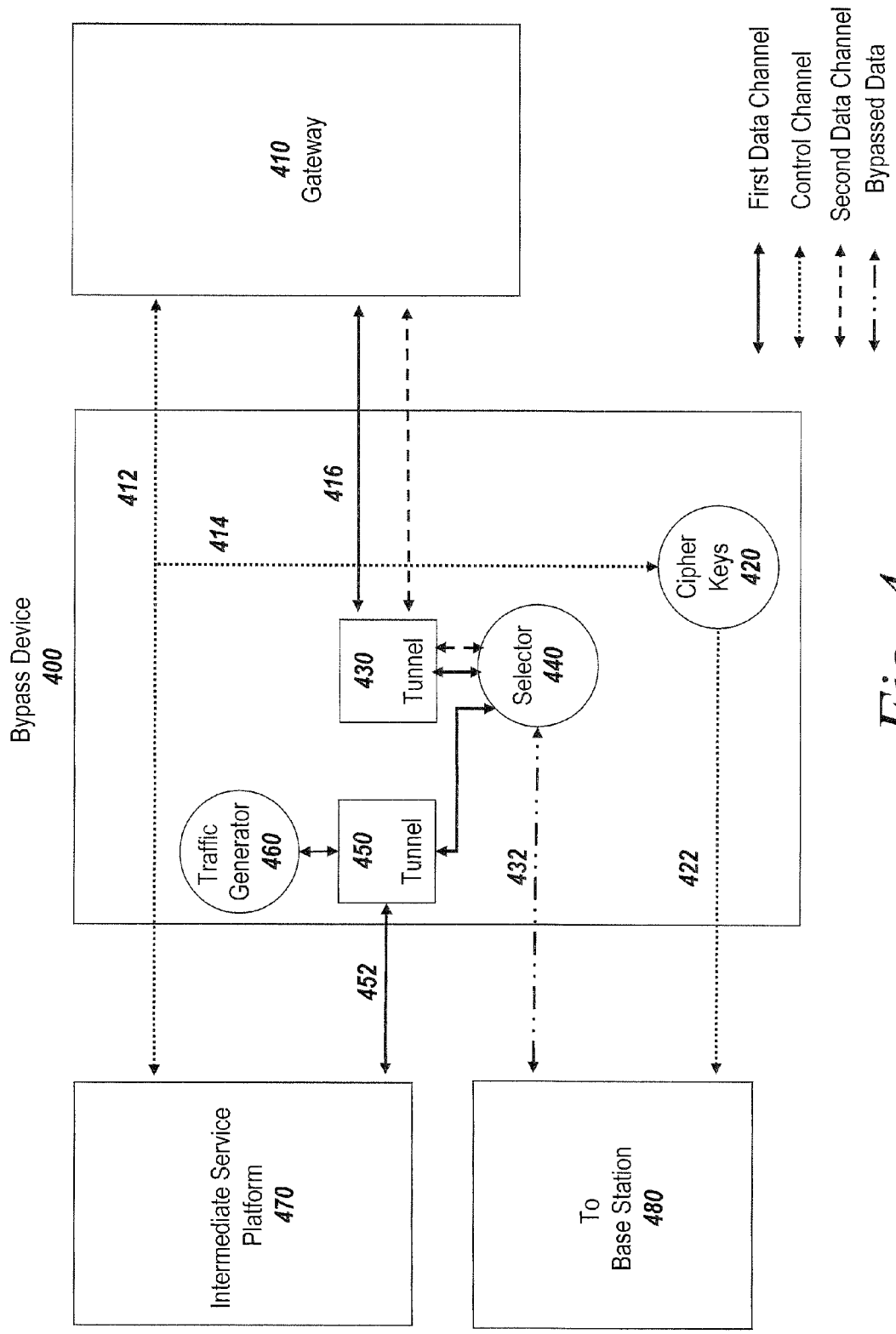
FIG. 4 graphically depicts the functions performed on an upstream side of a bypass device 400 according to exemplary embodiments

FIG. 4 graphically depicts the functions performed on an upstream side of a bypass device 400 according to exemplary embodiments. The bypass device 400 may monitor a control channel 412. For example, the control channel 412 may be a control channel employing the RANAP protocol, and the bypass device 400 may monitor 414 the control channel 412 in order to receive and distribute cipher keys 420 to other network devices. In order to distribute the cipher keys 420, the bypass device 440 may generate an outbound control channel 422.

The bypass device 400 may receive user traffic 416 including a first data channel and a second data channel bound from the gateway 410 towards the intermediate service platform 470. Alternatively, the bypass device 400 may intercept the second data channel while allowing the first data channel to pass directly to the intermediate service platform 470. The user traffic 416 may be received on an input of the bypass device 400 that is appropriate to the type of data channel carrying the user traffic 416. For example, if the user traffic 416 is carried on a particular radio frequency, the bypass 400 may receive the user traffic 416 using a radio receiver. Other types of inputs include, but are not limited to, fiber optic receivers, coaxial receivers, and ports for registered jacks.

In order to send and receive data to and from the gateway 410 or the intermediate service platform 470, the bypass device 400 may employ a tunneling protocol 430, 450. A tunneling protocol is a network protocol wherein a delivery protocol encapsulates a payload protocol. Using tunneling, a payload can be delivered over an otherwise incompatible network protocol. For example, if the access network employs the General Packet Radio Service (GPRS) system, the bypass device 400 may emulate the GTP-U tunneling protocol over a tunnel 430 that connects the bypass device 400 to either the remote node (directly or indirectly) or the intermediate device 470 over a data channel 452.

If the user traffic 416 includes a first data stream for processing by the intermediate service platform 430, the bypass device 400 may include a selector 440 for differentiating between data traffic that is in the first data channel and data traffic that is in the second data channel. The selector 440 may be implemented in hardware or software. The selector 440 may differentiate between data traffic in the first data channel and data traffic in the second data channel based on any distinguishing characteristics of the data channel or the data itself. For example, if the first data channel is transmitted on a certain radio frequency and the second data channel is transmitted on a different radio frequency, the selector 440 may differentiate between the data channels based on frequency. If the first and second data channels involve data packets in different formats but are carried on the same radio frequency, the selector 440 may differentiate the data channels based on the format of the data packets. One of ordinary skill in the art will recognize that other ways of differentiating data are also possible, and that the above description is meant to be exemplary only.

The selector 440 forwards data traffic from the first data channel to the intermediate service platform 470, for example by employing a tunnel 450 to provide the first data stream to the intermediate service platform 470. The tunnel 450 may utilize the same tunneling protocol as the tunnel 430, or may employ a different tunneling protocol.

Figure 6:
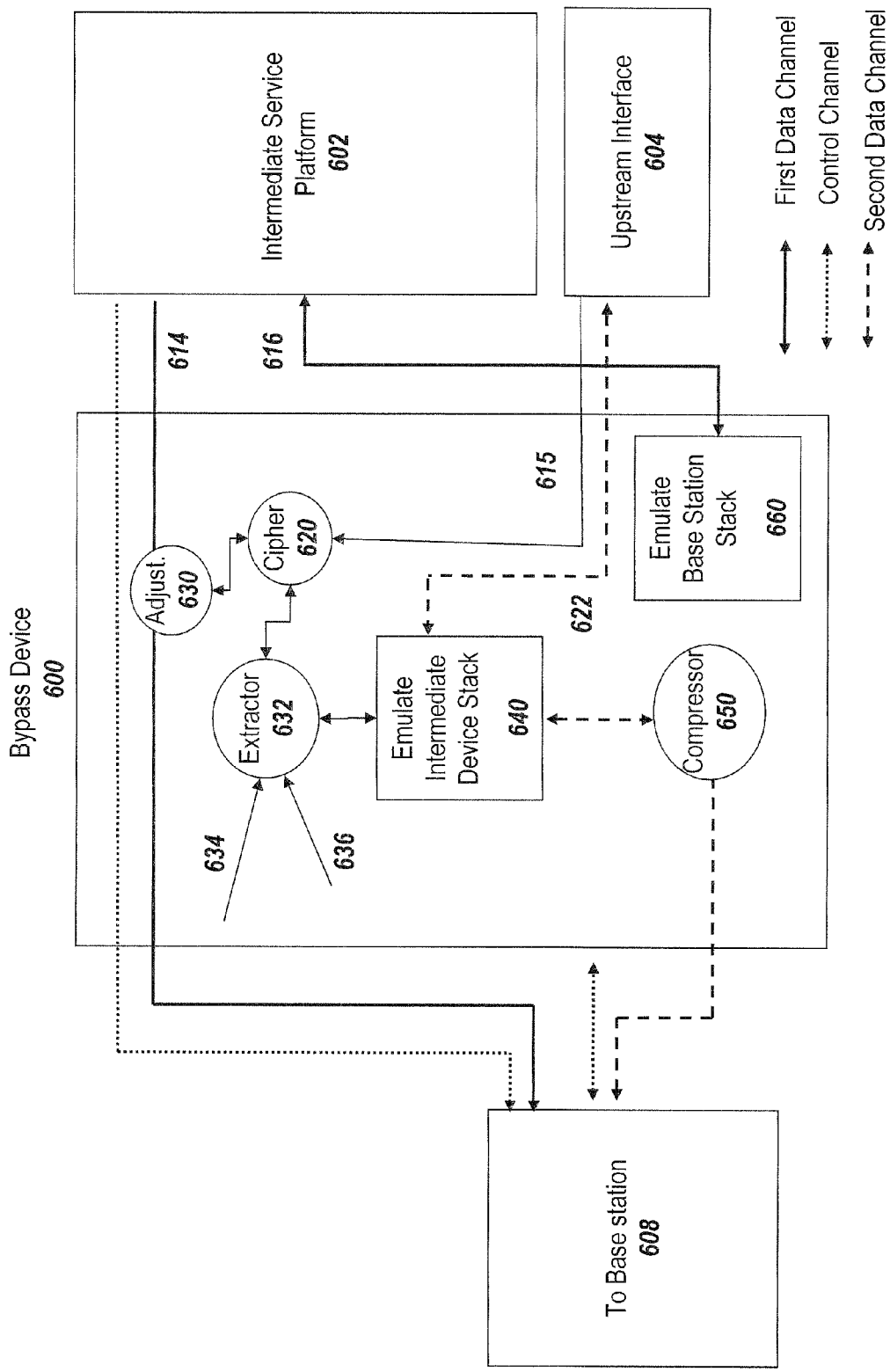
FIG. 6 graphically depicts the functions performed on a downstream side of a bypass device 600 according to exemplary embodiments FIG. 7 graphically depicts an exemplary data flow configuration according to exemplary embodiments.

The selector 440 further forwards data traffic from the second data channel to other components of the bypass device 400 for optimization, or alternatively may transmit the data to other devices in the access network as bypassed data 432. The bypassed data may first be compressed and ciphered, as discussed in more detail below with respect to FIG. 6 depicting the downstream side of the bypass device 400.

While the bypass device 400 is routing data, the intermediate service platform 470 may be tasked with managing the active channels in the access network. The intermediate service platform 470 may instruct devices in the network to utilize common channels rather than specialized channels in order to conserve network resources. However, this may cause problems when the intermediate service platform 470 is bypassed, because although network traffic continues to be routed by the bypass device 400 (potentially relying on one or more specialized channels), the bypassed intermediate service platform 470 may be unaware of the presence of the specialized data and may therefore instruct the other devices in the network not to use the specialized channels.

Accordingly, a traffic generator 460 on the bypass device 400 may generate keep-alive traffic to be provided to the intermediate service platform 470 through the tunnel 450. The traffic generator 460 may be implemented in software or hardware. The traffic generator 460 generates enough specialized traffic so that the intermediate service platform 470 continues to keep one or more specialized channels open. The traffic generator 460 may be configured to generate a minimum amount of traffic for the intermediate service platform 470 such that the generated amount of traffic meets or only marginally exceeds the threshold at which the intermediate service platform 470 determines that a specialized channel is not idle and therefore maintains the specialized channel in an open configuration.

In one exemplary embodiment employing the traffic generator 460, the intermediate service platform 470 may be a network controller, which may switch between different network channels for a variety of purposes. For example, a radio network controller (RNC) may switch an HSDPA call from the HS-DSCH (Downlink Shared Channel) and DCH (Dedicated Channel) to the FACH/RACH (Forward Access Channel/Random Access Channel) common channels when the HSDPA channel is idle. This allows the RNC to conserve network resources during periods of inactivity. To determine whether the HSDPA channel is idle, the RNC maintains a system-configured inactivity timer known as the down-switch timer. The value of the down-switch timer, which may be expressed in seconds, represents an amount of time. If a certain amount of network traffic has not utilized the HSDPA channel in the amount of time represented by the down-switch timer, the RNC switches to the common channel. This minimum amount of network traffic required to keep the RNC on the HS-DSCH and DCH channels is known as the up-switch threshold, and it may be expressed in, for example, bytes.

Figure 5:
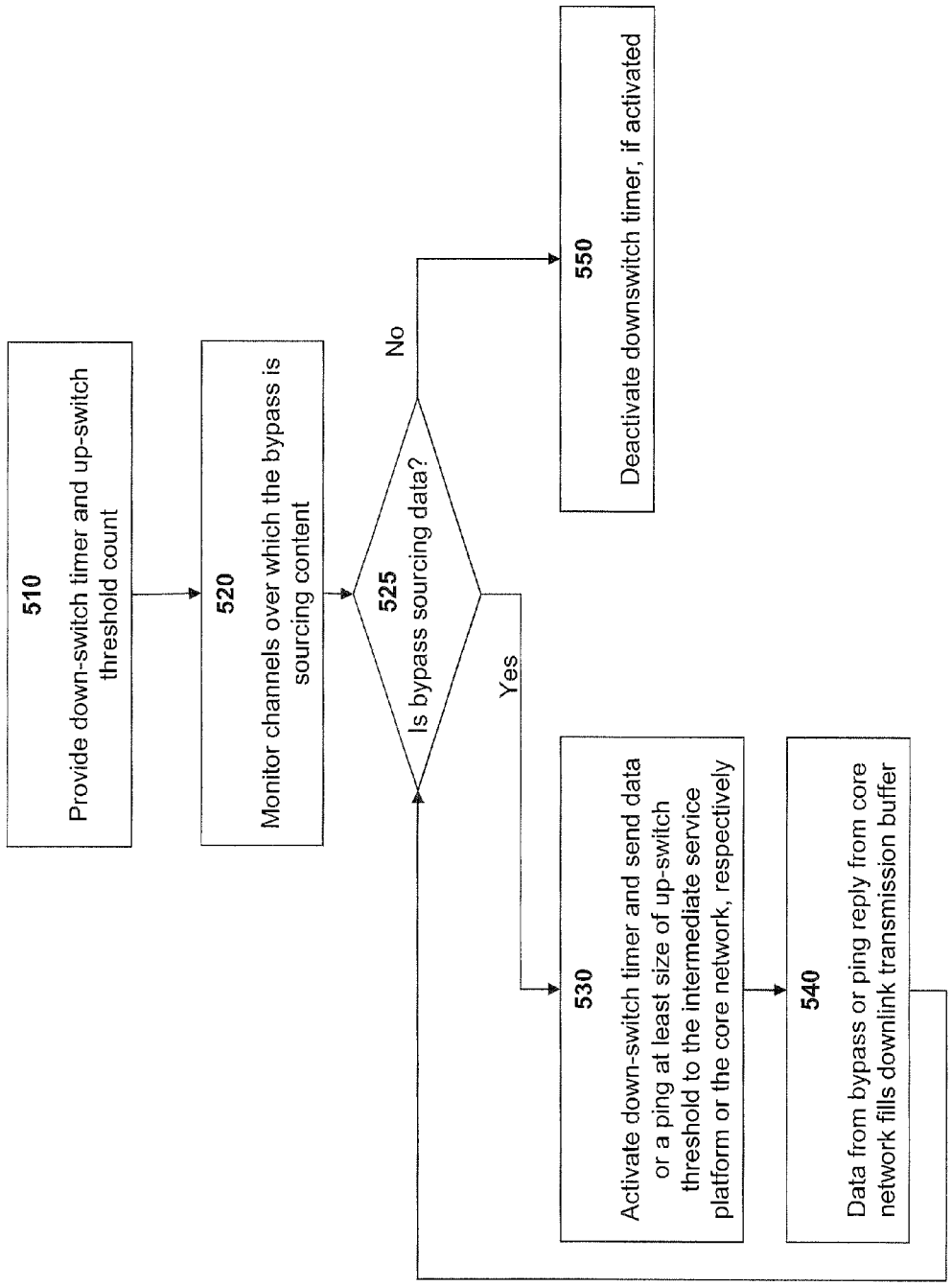
FIG. 5 is a flow chart depicting a procedure to prevent channel switching by an intermediate service platform managing a number of channels in a network during content sourcing.

In order to prevent channel switching by the intermediate service platform 470, it may be necessary to force the intermediate service platform 470 to remain on the currently active channel using a procedure similar to the one depicted in FIG. 5.

FIG. 5 depicts a procedure to prevent channel switching by an electronic device managing a number of channels in a network during local content sourcing. In the exemplary embodiment described in FIG. 5, the intermediate service platform may be a Radio Network Controller (RNC) and the bypass device may be an RNC Bypass. Although FIG. 5 is described with reference to an intermediate service platform and a bypass, the method performed in FIG. 5 is not so limited, and can be readily employed with any suitable device.

The intermediate service platform maintains a down-switch timer and an up-switch threshold, as described above. At step 510 the bypass maintains a second down-switch timer with a value less than the network controller's down-switch timer. The bypass also maintains a second up-switch threshold with a value larger than the intermediate service platform's up-switch threshold.

At step 520, the bypass monitors the channels over which the intermediate service platform is sourcing data. If the bypass determines, at step 525, that the intermediate service platform is sourcing data, then the bypass activates the down-switch timer at step 530. Before the amount of time specified by the down-switch timer has elapsed, the bypass sends data of size at least equal to the up-switch threshold to the intermediate service platform.

Alternatively, the bypass may send a ping to the core network. A "ping" is a tool used in computer networks to test a number of parameters in the network. A ping may be, for example, a data packet from one device to another. A first device may send a ping, for example, an ICMP echo request packet, to a second device. The second device may respond with an ICMP echo response reply when it receives the initial ping. When the first device receives the ping reply, the first device may use the reply to calculate network parameters, such as the round-trip time from when the first ping was sent to when the reply ping was received. The first device may also use pings to measure the amount of data loss in a network, or to determine whether another device is reachable, or to determine what route a data stream will use through the network when communicating between two devices.

When the bypass sends a ping to the core network as described above, the core network sends a reply ping back to the access network in which the bypass is located. This ping reply passes through the intermediate service platform.

When the data or ping is received by the intermediate service platform, because the down-switch timer maintained by the bypass is less than the down-switch timer maintained by the intermediate service platform, the data or ping reply arrives at the intermediate service platform before intermediate service platform's down-switch timer has elapsed. Further, because the up-switch threshold maintained by the bypass is greater than the up-switch threshold maintained by the intermediate service platform, the data or ping reply exceeds intermediate service platform's up-switch threshold. This causes the data or ping reply to fill the intermediate service platform's downlink transmission buffer at step 550, which causes the intermediate service platform to remain on the active channel.

On the other hand, if the bypass is not actively sourcing data (step 525), then the intermediate service platform deactivates the down-switch timer at step 550. This allows the intermediate service platform to revert to the common channel when the active channel is actually idle, conserving network resources.

FIG. 6 graphically depicts the functions performed on a downstream side of a bypass device 600 that bypasses an intermediate device 602 according to exemplary embodiments.

In order to send and receive data to and from the devices in the network, the bypass device 600 may emulate a protocol stack or a portion of a protocol stack used by other devices in the network. For example, if the intermediate service platform 602 performs functions at layers 2 and 3 of the OSI model, the emulated protocol stack 640 may perform the L2 and L3 functions of the intermediate service platform 602. Alternatively, the emulated protocol stack may involve only L2 functions. Accordingly, the emulated protocol stack may include the entire protocol stack of another device in the network, or only the portions of the protocol stack that are needed to allow the emulating device to process data in the network. More specifically, if the bypass device emulates some or all of the protocol stack 640 of the intermediate service platform 602, where the intermediate service platform 602 is an RNC, the emulated stack may involve emulating various radio protocols, including the Radio Link Control (RLC) protocol, the Medium Access Control (MAC) protocol, and manage the FP transmissions between the base station 608 and the intermediate service platform 602.

By emulating a device in the network, the bypass device 600 appears to be the emulated device to other devices in the network. Accordingly, the bypass device 600 can communicate with devices in the network without having to reconfigure the other devices.

The second data channel 622 may be intercepted by the bypass device 600 emulating some or all of the protocol stack 640 utilized by the intermediate service platform 602. Similarly, the bypass device 600 may emulate some or all of the protocol stack 660 of the base station 608 in order to send and receive data in the first data channel. The emulated protocol stack 660 may allow the bypass device 600 to emulate a flow control mechanism of the base station 608.

In some embodiments, the bypass device 600 may also monitor control plane traffic. The intermediate service platform 602 may be tasked with generating and processing control plane traffic, and the bypass device 600 may receive and utilize the control plane traffic to process and forward data.

The bypass device 600 may extract ciphering keys 615 from the upstream interface 604, as described above. The ciphering keys 614 may be used by a ciphering tool 620 to decipher any ciphered data in the data stream, and to cipher any outgoing data.

If the data stream includes transport channels such as FACH/RACH channels, the bypass device may adjust the transport layer traffic. The bypass device 600 accordingly may further include an adjustor 630 for adjusting the transport layer traffic.

The bypass device 600 may further include an extractor 632 to extract and modify status information from higher-level protocol messages. For example, if the network employs the Radio Link Control protocol (RLC), messages may be received in different formats, such as macro-diverse DCH/HSUPA messages 634 and DCH/HSUPA/RACH messages 636. These messages may be used to forward data in an upstream direction, and may include status information that may need to be updated if the messages are intercepted or processed by the bypass device 600. Accordingly, the extractor 632 extracts and modifies the RLC status. The extractor 632 may further provide acknowledgements (ACK) and not received messages (NAK) to the emulator emulating the protocol stack 640. The extractor 632 and adjustor 630 may work together to extract and modify status information.

The bypass device 600 may also include a compressor 650 for compressing data received from the second data stream. The compressor 650 may be implemented in hardware or software. The compressor may utilize any appropriate compression algorithm, and may select a compression algorithm based on the type of data present in the second data stream. The bypass device 600 may also perform other maintenance functions, such as discarding keep-alive messages as necessary, adjusting traffic information to account for the bypassed data traffic, and providing error-protection for data sent out on the bypass channel.

Figure 7:
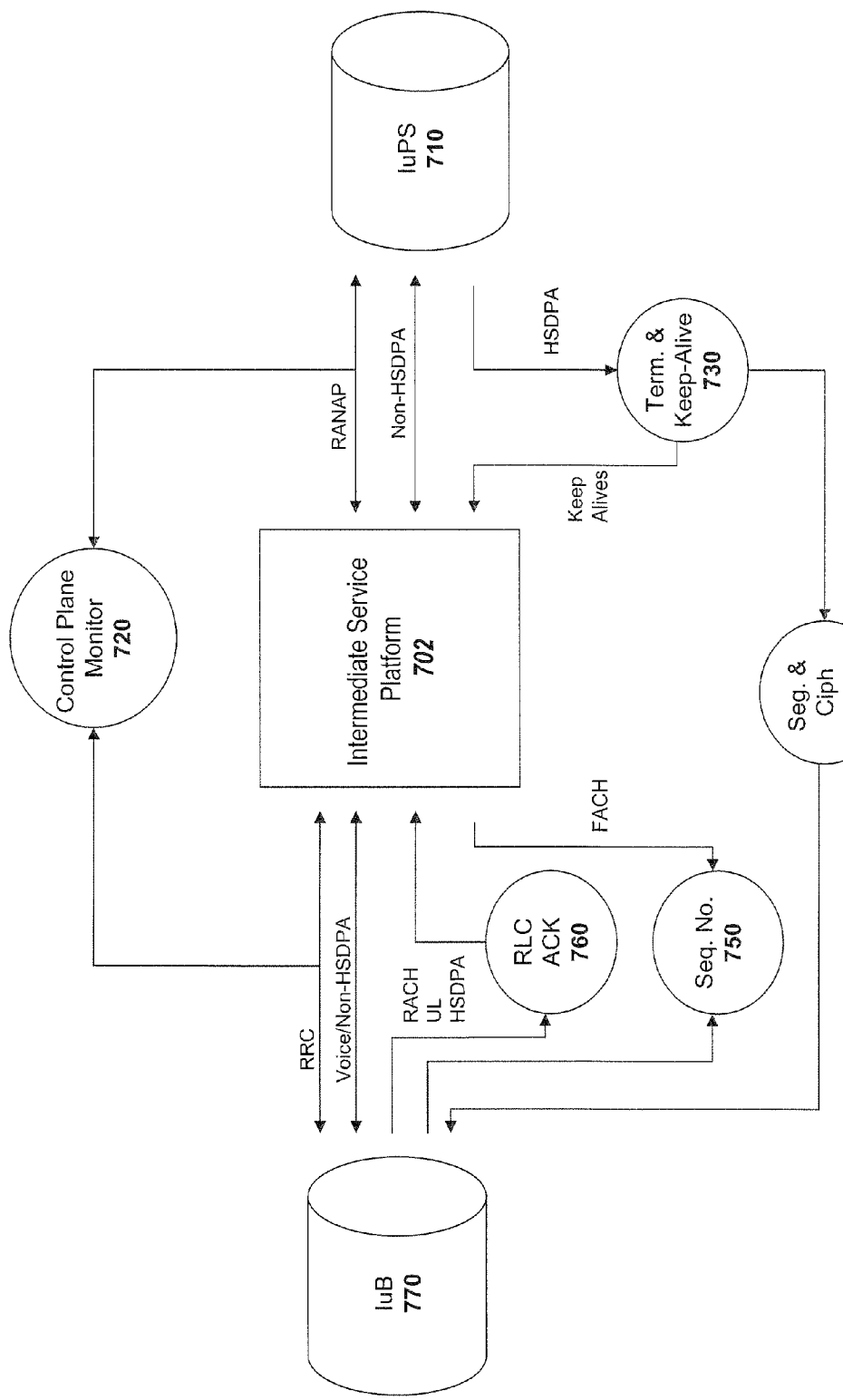

In order to clarify the functionality described in the abstract in FIGS. 4-6, FIG. 7 provides a detailed explanation of the functions performed by the bypass device with respect to one embodiment in an HSPA communication network. FIG. 7 graphically depicts an exemplary data flow configuration for bypassing an intermediate service platform 702 according to exemplary embodiments. FIG. 7 depicts a data flow specifically in a network employing HSPA, although one of ordinary skill in the art will understand that the present invention can be applied in other network configurations as well. In FIG. 7, functionality provided by the aforementioned bypass device is shown using circles.

In a conventional network, the data flows would pass from the IuPS interface 710 to the IuB interface 770 through the intermediate service platform 702. In the exemplary network configuration depicted in FIG. 7, some data processing is performed by the intermediate service platform 702, and some data processing is performed by a bypass device.

The intermediate service platform 702 may be tasked with receiving, processing, and forwarding control plane data and non-HSDPA data, such as conventional voice data. The control plane data may be, for example, governed by the Radio Resource Control (RRC) protocol on a downstream side of the intermediate service platform 702 and by the Radio Access Network Application Part (RANAP) protocol on an upstream side of the intermediate service platform 702.

The intermediate service platform 702 may be tasked with generating control plane data based on current network conditions and may control channel switching in the network, as described above. The bypass device may monitor the control plane 720 on the upstream and downstream sides of the intermediate service platform 702 in order to route data in accordance with traffic policies set or received by the intermediate service platform 702.

The bypass device may create a tunnel 730 for receiving HSDPA data on the IuPS interface, such as a GTP-U tunnel, as described above. The tunneling functionality 730 of the bypass device may also terminate and/or emulate some or all of the protocol layers involved in an active data session. Based on the information and data that passes through the bypass device, keep-alive messages may be provided to the intermediate service platform 702.

The bypass device may further include an emulator 740 for emulating intermediate service platform 702 protocols and base station protocols. For example, if the intermediate service platform 702 is an RNC, the emulator 740 may emulate the FP, MAC, and RLC protocols. If the base station is a Node B, the emulator 740 may emulate some or the entire protocol stack for User Equipment (UE). The emulator 740 allows data, such as HSDPA traffic, to be injected onto the IuB interface 770.

The bypass device may also include a modifier 750 for modifying the RLC sequence number, and an extractor 760 for extracting and modifying RLC status information, as described above with respect to FIG. 6.

Figure 8:
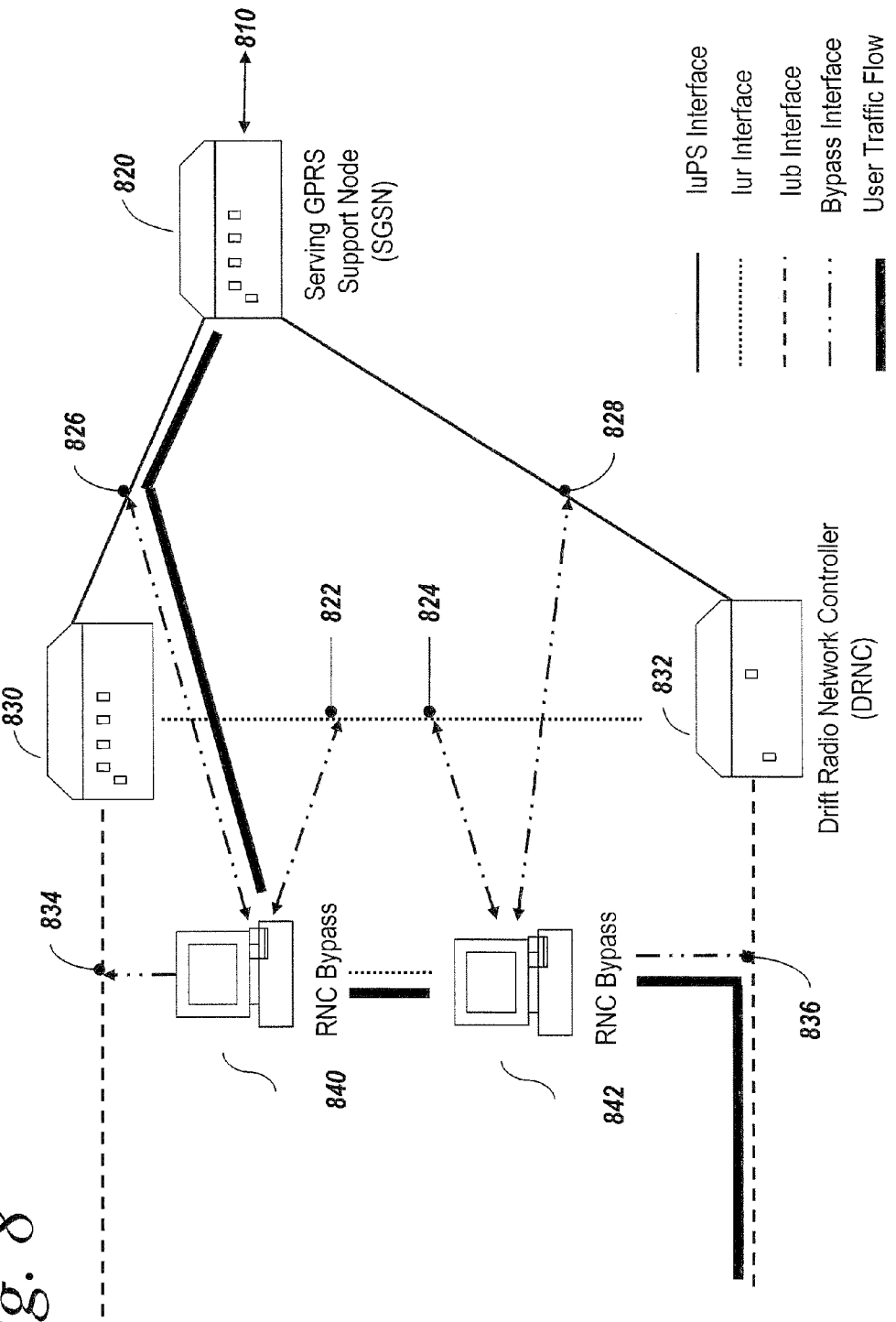
FIG. 8 depicts an example of moving data flows between intermediate service platforms using exemplary bypass devices 840, 842 according to exemplary embodiments.

FIG. 8 depicts an example of moving data flows between intermediate service platforms using exemplary bypass devices according to exemplary embodiments. One advantage of the bypass device described herein is that it allows for mobility between different intermediate service platforms, and further allows multiple intermediate service platforms to be bypassed.

For example, an exemplary network as shown in FIG. 8 includes a Serving GPRS Support Node (SGSN) 820 which is responsible for the delivery of data packets to and from user devices 810 within a geographical service area. The network further includes a Supporting Radio Network Controller (SRNC) 830 and a Drift Radio Network Controller (DRNC) 832. In a handoff situation (e.g., when a user device moves between two different access networks), the SRNC 830 initially maintains an RRC connection to the user device 810. When the user device moves to a different access network having a different RNC, the RRC connection to the user device 810 is maintained at the SRNC 830, but the DRNC 832 in the local access network acts as an intermediary between the user device 810 and the SRNC 830. In effect, the user device 810 communicates with the DRNC 832, which forwards and receives information and requests to and from the SRNC 830 over an Iur interface.

In the example depicted in FIG. 8, a number of RNC bypasses 840, 842 are used to monitor, intercept, and forward user traffic in order to facilitate inter-RNC mobility. One of ordinary skill in the art will understand that more or fewer bypass devices may be employed. In FIG. 8, the bypass devices monitor the traffic flow at various monitor points 822, 824 in order to determine when a user device 810 is moving between RNCs. The bypass devices also intercept the data flows at various interception points 826, 828, 834, 836 in order to bypass the intermediate devices, such as RNCs, in the network.

As shown in FIG. 8, a user traffic flow is routed from the SGSN 820 towards the SRNC 830. At intercept point 826, the RNC bypass 840 in the same access network as the SRNC 830 intercepts the user traffic flow before the user traffic flow reaches the SRNC 830. The RNC bypass 840 then forwards the user traffic flow to another RNC bypass 842 located the same access network as the DRNC 832. The RNC bypass 840 and the RNC bypass 842 may communicate with each other using conventional interfaces, such as the Iur interface, or may utilize a custom interface in order to improve network performance.

The RNC bypass 842 may process the data and inject the user traffic flow onto the IuB interface upstream of the DRNC 832. In this way, both the SRNC 830 and the DRNC 832 may be bypassed and user mobility is facilitated.

Figure 9:
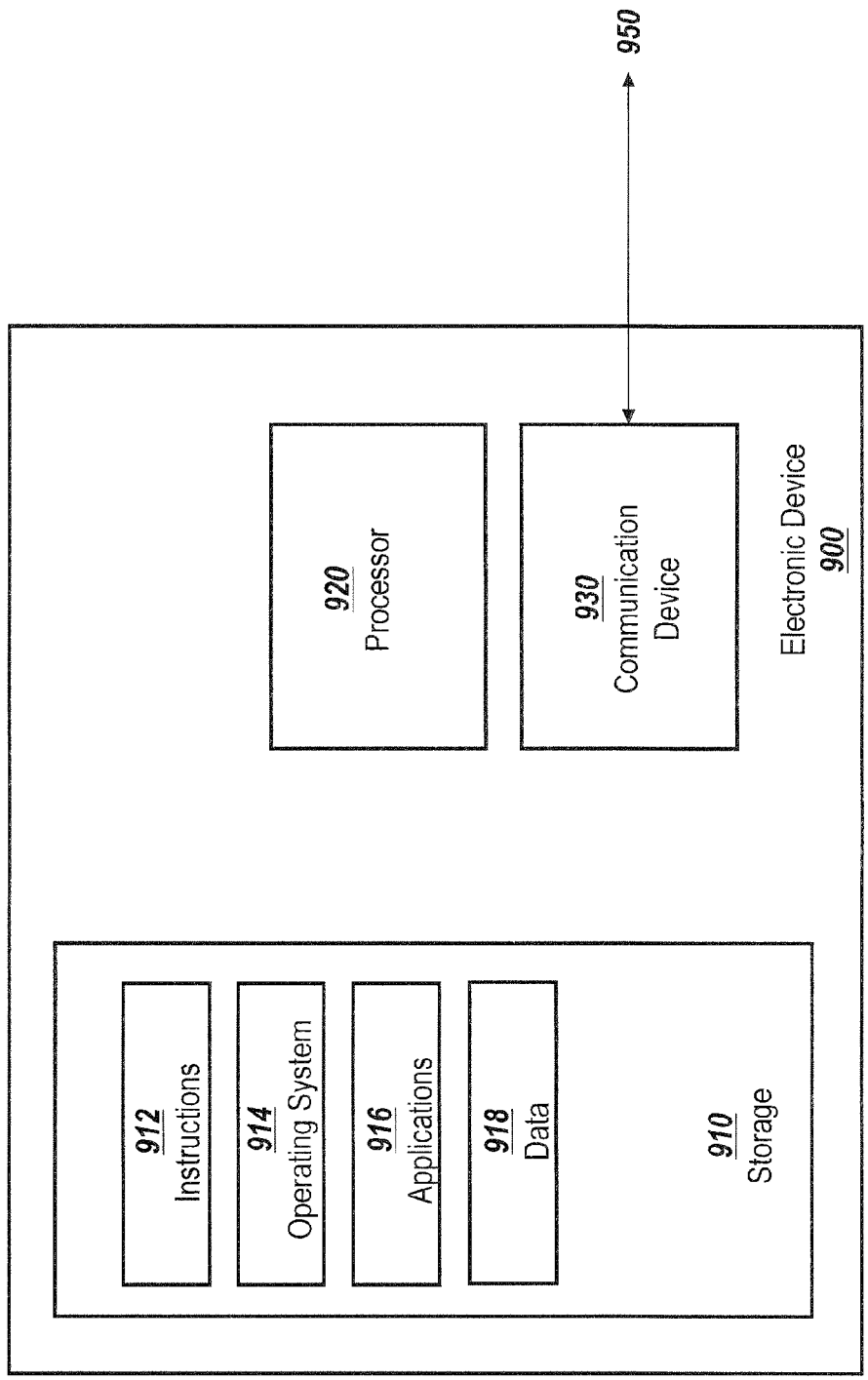
FIG. 9 depicts an electronic device 900 suitable for use in exemplary embodiments.

FIG. 9 depicts an electronic device 900 suitable for use in exemplary embodiments. The electronic device 900 may contain a storage 910 for storing instructions 912 to be executed by one or more processors 920, such as a microprocessor, ASIC, FPGA, or a controller. The instructions 912 may be stored on one or more electronic device readable storage media. Examples of electronic device-readable storage media include, but are not limited to, RAM, ROM, magnetic storage media, or optical storage media, such as CDs or DVDs. Instructions 912 may cause the processor 920 to perform a series of steps described in detail herein. The instructions 912 may be in any form that describes how to perform these steps. For example, the instructions may be uncompiled code in any suitable programming language, compiled code, assembly language instructions, or any other type of instructions.

The storage 910 may also store an operating system 914 for operating the electronic device 900. The storage 910 may store additional applications 916 for providing additional functionality, as well as data 918 for use by the electronic device 900 or another device.

The electronic device 900 may have a communication device 930 for communicating with a communication network 950. The communication device 930 may be, for example, a modem, an Ethernet connection, a fiber optic connection, a radio antenna, or any suitable means for communicating with a network. The communication device 930 may be of a type that is capable of communicating on a particular data channel to be received by an input of a receiving device connected to the data channel. For example, if the data channel involves a radio channel, the communication device 930 may be a radio transmitter. Other types of communication devices 930 include, but are not limited to, lasers for use in fiber optic networks, modulators, and ports for registered jacks. The input and output of the communication device 930 may be the same component, or may be different components.

The electronic device 900 may proxy a transport protocol in an access network. For example, if the network is a UMTS network, the electronic device 900 may proxy an Iu-B or an Iu-PS protocol. However, the present disclosure is not limited to implementation in a UMTS network, and may be deployed in any suitable communication network. The transport protocol employed will vary based on the type of communication network utilized.

Although the above description has been given with specific examples from a mobile network, one having ordinary skill in the art will recognize that the present invention is not so limited, and may be applied in any type of network.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the invention, and exclusive use of all modifications that come within the scope of the appended claims is reserved. It is intended that the present invention be limited only to the extent required by the appended claims and the applicable rules of law.

The invention claimed is:

1. A method for bypassing a radio network controller in transmitting data in a communication network, the method performed in an electronic device in the communication network having an access network and a core network, the method comprising:
   receiving, by the electronic device, data traveling from the core network;
   intercepting, by the electronic device, the data before the data enters into the radio network controller in the access network, wherein the data includes a first subset of the data and a second subset of the data;
   selecting, by the electronic device, one of the first subset of the data and the second subset of the data;
   processing, by the electronic device, the first subset of the data;
   forwarding the processed first subset of the data to a base station in the access network; and
   forwarding the second subset of the data to the base station via the radio network controller.

2. The method of claim 1, further comprising monitoring a control channel and using information in the control channel to forward the data.

3. The method of claim 1, further comprising emulating, by the electronic device, at least a portion of a radio network controller protocol stack.

4. The method of claim 1, wherein the access network is a High Speed Packet Access (HSPA) network, the first subset of the data comprises data in a High Speed Downlink Packet Access (HSDPA) format, and the second subset of the data comprises data in a non-High Speed Downlink Packet Access format.

5. The method of claim 1, wherein the access network is a Universal Mobile Telecommunications System (UMTS) access network.

6. A non-transitory electronic device readable storage medium storing executable instructions for performing a method for bypassing a radio network controller in transmitting data in a communication network, the method in an electronic device in the communication network having an access network and a core network, the instructions executable by one or more processors to cause the one or more processors to:
   receive the data traveling from the core network;
   intercept the data before the data enters into the radio network controller in the access network, wherein the data includes a first subset of the data and a second subset of the data;
   select one of the first subset of the data and the second subset of the data;
   process the first subset of the data;
   forward the processed first subset of the data to a base station in the access network; and
   forward the second subset of the data to the base station via the radio network controller.

7. The electronic device readable storage medium of claim 6, wherein processing the first subset of the data comprises ciphering or compressing the first subset of the data.

8. The electronic device readable storage medium of claim 6, further comprising instructions monitoring a control channel and using information in the control channel to forward the first subset of the data.

9. The electronic device readable storage medium of claim 6, further comprising emulating at least a portion of a radio network controller protocol stack.

10. The method of claim 6, wherein the access network is a High Speed Packet Access (HSPA) network, the first subset of the data comprises data in a High Speed Downlink Packet Access (HSDPA) format, and the second subset of the data comprises data in a non-High Speed Downlink Packet Access format.

11. The electronic device readable storage medium of claim 6, wherein the access network is a Universal Mobile Telecommunications System (UMTS) access network.

12. A system for use in a communication network having an access network and a core network, the system bypassing a radio network controller in transmitting data in the communication network, the system comprising:
   a storage for storing instructions and data received from the core network; and
   one or more processors for executing instructions, the instructions causing the one or more processors to:
      receive the data, data traveling from the core network;
      intercept the data before the data enters into the radio network controller in the access network, wherein the data includes a first subset of the data and a second subset of the data;
      select one of the first subset of the data and the second subset of the data;
      process the first subset of the data;

forward the processed first subset of the data to a base station in the access network; and forwarding the second subset of the data to the base station via the radio network controller.

13. The system of claim 12, wherein the one or more processors are further configured to perform dynamic policy enforcement that selectively invokes network policies based on traffic flows.

14. The system of claim 12, wherein the one or more processors are further configured to emulate at least a portion of a radio network controller protocol stack.

15. The system of claim 12, wherein the access network is a High Speed Packet Access (HSPA) network, the first subset of the data comprises data in a High Speed Downlink Packet Access (HSDPA) format, and the second subset of the data comprises data in a non-High Speed Downlink Packet Access format.

16. The system of claim 12, wherein the access network is a Universal Mobile Telecommunications System (UMTS) access network.

17. The system of claim 12, wherein the one or more processors in the access network further comprises forwarding, in order to transmit the data between different access networks, the first subset of the data to an electronic device, wherein the electronic device is located in another access network, the electronic device bypassing a radio access network in the other access network.

18. The system of claim 12, wherein processing the first subset of the data comprises ciphering or compressing the first subset of the data.

19. The system of claim 12, wherein processing the first subset of the data comprises performing error detection on the first subset of the data.

* * * * *